(12) United States Patent
Zhao et al.

(10) Patent No.: US 9,324,125 B2
(45) Date of Patent: Apr. 26, 2016

(54) METHODS AND APPARATUSES FOR RENDERING CT IMAGE DATA

(71) Applicants: Tsinghua University, Haidian District, Beijing (CN); Nuctech Company Limited, Haidian District, Beijing (CN)

(72) Inventors: Ziran Zhao, Beijing (CN); Li Zhang, Beijing (CN); Zhiqiang Chen, Beijing (CN); Shuo Wang, Beijing (CN); Jianping Gu, Beijing (CN); Yunda Sun, Beijing (CN)

(73) Assignees: Tsinghua University, Haidian District, Beijing (CN); Nuctech Company Limited, Haidian District, Beijing (CN)

( * ) Notice: Subject to any disclaimer, the term of this patent is extended or adjusted under 35 U.S.C. 154(b) by 28 days.

(21) Appl. No.: 14/540,413

(22) Filed: Nov. 13, 2014

(65) Prior Publication Data

US 2015/0206326 A1 Jul. 23, 2015

(30) Foreign Application Priority Data

Nov. 18, 2013 (CN) .......................... 2013 1 0574486

(51) Int. Cl.
*G06K 9/00* (2006.01)
*G06T 1/00* (2006.01)
*G06T 15/08* (2011.01)
(Continued)

(52) U.S. Cl.
CPC ............... *G06T 1/0007* (2013.01); *G06T 1/20* (2013.01); *G06T 3/403* (2013.01); *G06T 7/0053* (2013.01); *G06T 7/0059* (2013.01); *G06T 7/0065* (2013.01); *G06T 11/001* (2013.01); *G06T 15/04* (2013.01); *G06T 15/06* (2013.01); *G06T 15/08* (2013.01); *G06T 15/205* (2013.01); *G06T 15/405* (2013.01); *G06T 15/60* (2013.01); *G06T 15/80* (2013.01); *G06T 2200/04* (2013.01); *G06T 2200/08* (2013.01); *G06T 2200/28* (2013.01); *G06T 2207/10072* (2013.01);
(Continued)

(58) Field of Classification Search
None
See application file for complete search history.

(56) References Cited

U.S. PATENT DOCUMENTS

| | | | | |
|---|---|---|---|---|
| 5,898,793 A | * | 4/1999 | Karron | ..................... G06T 17/20 382/131 |
| 2006/0094951 A1 | * | 5/2006 | Dean | ................... A61F 2/30942 600/407 |

(Continued)

FOREIGN PATENT DOCUMENTS

WO 2009/017931 A2 2/2009

OTHER PUBLICATIONS

Hadwiger, C. et al., "High-quality two-level volume rendering of segmented data sets on comsumer graphics hardware", *Proceedings of the 14th IEEE Visualization Conference*, 301-308 (2003).

(Continued)

*Primary Examiner* — Shervin Nakhjavan
(74) *Attorney, Agent, or Firm* — Merchant & Gould P.C.

(57) ABSTRACT

The present disclosure provides a method for rendering of CT image data. The method includes acquiring 2D image data of a background and 2D image data of a target; rendering the 2D image data of the target into a 3D image of the target to obtain a first hit position of a ray; rendering the 2D image data of the background into a 3D image of the background; adjusting the 3D image of the background based on the first hit position; and synthetically rendering the 3D image of the background and the 3D image of the target. The present disclosure also provides apparatus for implementing the method.

10 Claims, 5 Drawing Sheets

(51) Int. Cl.
  *G06T 1/20* (2006.01)
  *G06T 3/40* (2006.01)
  *G06T 7/00* (2006.01)
  *G06T 11/00* (2006.01)
  *G06T 15/04* (2011.01)
  *G06T 15/06* (2011.01)
  *G06T 15/20* (2011.01)
  *G06T 15/40* (2011.01)
  *G06T 15/60* (2006.01)
  *G06T 15/80* (2011.01)

(52) U.S. Cl.
  CPC .. *G06T 2207/10081* (2013.01); *G06T 2210/04* (2013.01); *G06T 2215/12* (2013.01); *G06T 2219/2008* (2013.01)

(56) References Cited

U.S. PATENT DOCUMENTS

2008/0024493 A1* 1/2008 Bordoloi .................. G06T 15/08
                                                                345/423
2015/0022522 A1* 1/2015 Li .......................... G06T 19/00
                                                                345/424
2015/0363962 A1* 12/2015 Schmidt ................. G06T 15/08
                                                                345/424

OTHER PUBLICATIONS

Hauser, H. et al., "Two-level volume rendering—fusing MIP and DVR". *Proceedings of IEEE Visualization*, 211-218 (2000).

Max, N., "Optical models for direct volume rendering", *IEEE Transactions on Visualization and Computer Graphics*, 1(2): 99-108 (1995).

Extended European Search Report for corresponding European Patent Application No. 14193139A mailed Jan. 16, 2015.

Hauser, H. et al., "Two-level volume rendering", IEEE Transactions on Visualization and Computer Graphics IEEE USA, 7(3): 242-252 (2001).

Ying, Z. et al., "Dual Energy Volumetric X-ray Tomographic Sensor for Luggage Screening", Proceedings of the 2007 IEEE Sensors Applications Symposium, pp. 1-6 (2007).

* cited by examiner

METHODS AND APPARATUSES FOR RENDERING CT IMAGE DATA

This application claims benefit of Serial No. 201310574486.5, filed 18 Nov. 2013 in China and which application is incorporated herein by reference. A claim of priority is made to the above disclosed application.

TECHNICAL FIELD

The present disclosure relates to 3-Dimensional (3D) image rendering, and more particularly, to methods and apparatuses for rendering of Computed Tomography (CT) image data.

BACKGROUND

The CT imaging system is widely used in medical imaging and target detection, for example, in security inspection. Compared with the perspective imaging system, the CT imaging system can provide not only a tomogram but also a 3D image of the inspected object, thereby improving detection accuracy. Now the CT imaging system has become mainstream security inspection means in critical places like airport and station. The CT imaging system using a single column or a few columns of detectors has advantages of low cost and small volume. However, Such CT imaging system performs a single-level large-pitch scanning, leading to large interlayer gap and poor definition in the reconstructed 3D image. This makes it difficult for an inspector to find a target in the reconstructed 3D image.

The Ray Casting method is one of the existing volume rendering techniques (Max N. Optical models for direct volume rendering. IEEE Transactions on Visualization and Computer Graphics, 1995, 1(2): 99-108) that are mostly used. The final result of the Ray Casting method is 2D image, and does not record a relation of relative positions of different objects in the image.

The Two-Level Volume Rendering technique (M. Hadwiger, C. Berger, and H. Hauser. High-quality two-level volume rendering of segmented data sets on consumer graphics hardware. In Proceedings of IEEE Visualization 2003, pp. 301-308. Los Alamitos, Calif.: IEEE Press, 2003) or (Helwig Hauser, Lukas Mroz, Gian-Italo Bischi, and Eduard Groller. Two-level volume rendering—fusing MIP and DVR. In proceedings of IEEE Visualization, pp. 211-218. Los Alamitos, Calif.: IEEE Press, 2000.) originates from a synthetic display of segmented and original data in medical image, and requires volume rendering to be in a form of Texture Mapping. the Texture Mapping is worse in imaging quality than the Ray Casting which uses Trilinear Interpolation, and will produce a noticeable transition phenomenon upon viewangle change.

For 3D image rendering in the security inspection field, a method is desirable that can provide display effect in which the target has a higher visual priority. It is further desirable that the spatial position relation of the target in the original data can be reserved to facilitate the inspector in distinguishing the target.

SUMMARY

In view of the above, the present disclosure provides a method for rendering of CT image data. The method includes acquiring 2-Dimensional (2D) image data of a background and 2D image data of a target; rendering the 2D image data of the target into a 3-Dimensional (3D) image of the target to obtain a first hit position of a ray; rendering the 2D image data of the background into a 3D image of the background; adjusting the 3D image of the background based on the first hit position; and synthetically rendering the 3D image of the background and the 3D image of the target.

In an embodiment, the method further comprises detecting and extracting an edge of the target in the synthetically-rendered 3D image.

In an embodiment, the rendering is performed using the Ray Casting method.

In an embodiment, the step of adjusting the 3D image of the background based on the first hit position comprises modifying a front-depth 3D image and a rear-depth 3D image of the background.

In an embodiment, the position of the initial incidence point of the ray is obtained using the Multiple Render Targets technology during rendering of the 3D image of the target.

With the rendering method of the present disclosure, it is possible to improve the 3D image rendering quality of the target, and increase the visual priority of the target in the background image. At the same time, it is possible to reserve the spatial position relation of the target in the background image, and further facilitate the inspector to identify the target.

BRIEF DESCRIPTION OF THE DRAWINGS

The present disclosure will be described in embodiments with reference to figures, in which.

DETAILED DESCRIPTION OF THE EMBODIMENTS

The particular embodiments of the disclosure are described below in details. It shall be noted that the embodiments herein are used for illustration only, but not limiting the disclosure. In the description below, a number of particular details are explained to provide a better understanding to the disclosure. However, it is apparent to those skilled in the art the disclosure can be implemented without these particular details. In other examples, well-known circuits, materials or methods are not described so as not to obscure the disclosure.

Throughout the specification, reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred at various positions throughout the specification may not refer to one and the same embodiment or example. Furthermore, specific features, structures or properties may be combined into one or several embodiments or examples in any appropriate ways. Moreover, it should be understood by those skilled in the art that figures here are for the purpose of illustration, and not necessarily drawn to scale. The term "and/or" used herein means any and all combinations of one or more listed items.

Figure 1A:
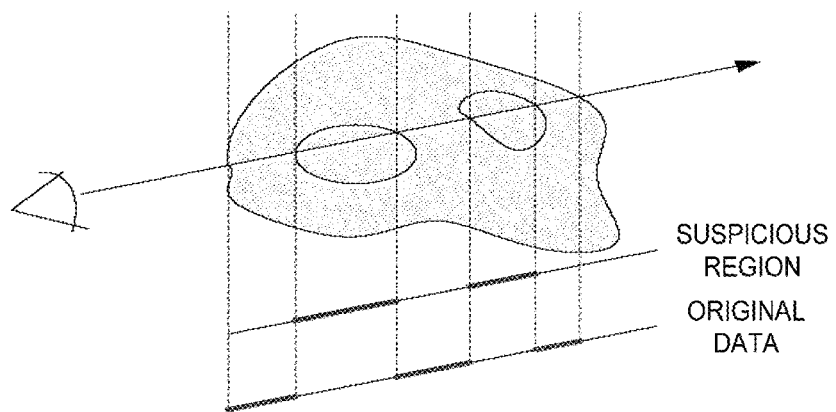
FIG. 1a is a schematic diagram showing the principle of the Two-Level Volume Rendering technique.
Figure 1B:
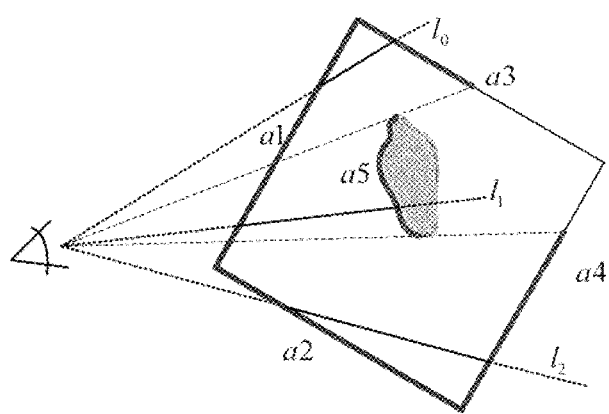
FIG. 1b is a schematic diagram showing the principle for adjusting ray hit and exit positions in the Two-Level Volume Rendering technique.

FIG. 1a is a schematic diagram showing the principle of a rendering technique, also called Two-Level Volume Rendering technique. In the first level rendering, a ray is cast into 2D image data, and a different rendering method is used according to data type to which a voxel retrieved at the current position of the ray belongs. Then, in the second level rendering, results of different types of rendering are synthesized. FIG. 1b is a schematic diagram showing the principle for adjusting ray hit and exit positions in the Two-Level Volume Rendering technique. Now detailed description will be provided with embodiments of the present disclosure.

Figure 2:
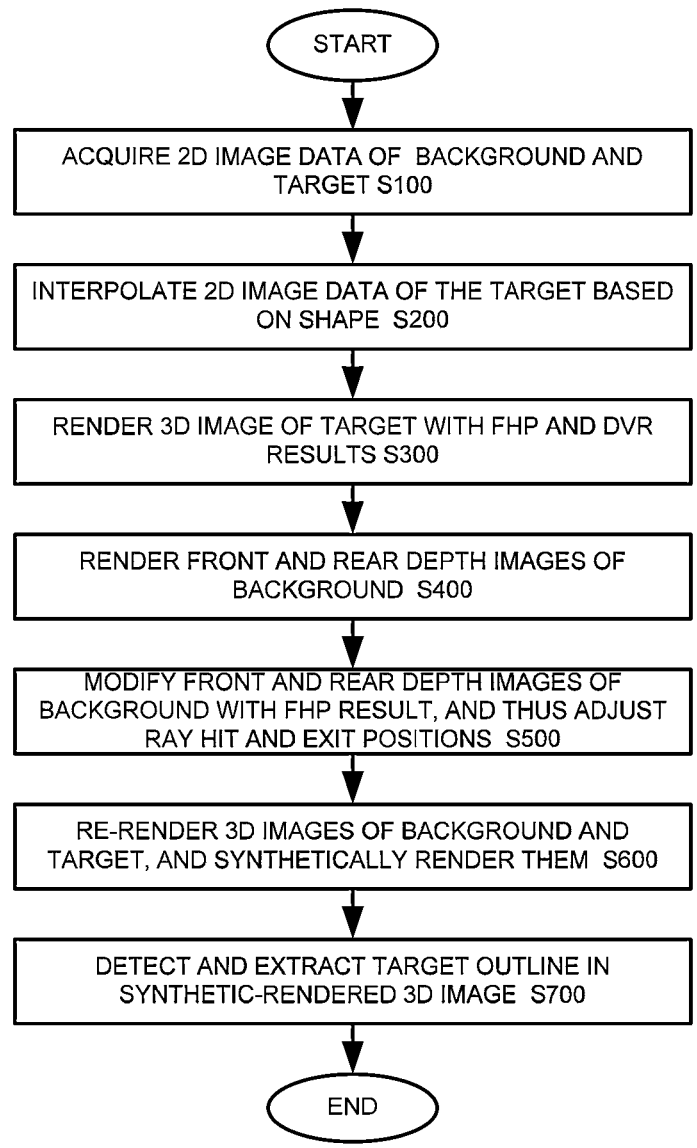
FIG. 2 is a schematic diagram showing a method for rendering of CT image data according to an embodiment of the disclosure.

FIG. 2 is a schematic diagram showing a method for rendering of CT image data according to an embodiment of the disclosure.

First, at step S100 of the method in FIG. 2, 2D image data of a background and 2D image data of a target are acquired. These image data may be acquired by a dual-energy security inspection CT imaging system which can scan and obtain grayscale data and material data of an object. As such, it is possible to render 3D images of the background and the target, respectively, using the 2D image data.

In the 3D image rendering, the rendering quality of the target is important for an inspector to read the image. Automatic identification of the target is performed on the reconstructed 3D tomogram data, i.e., the rendered 3D image. Accordingly, the interlayer gap between the rendered 3D image data is relatively large, resulting in a poor rendering of the target.

In the embodiment of the present disclosure, the 2D image data of the target are processed before the rendering to increase layers of data and thus to improve 3D rendering quality. In step S200 of the method in FIG. 2, shape-based interpolation is used to process the 2D image data of the target.

Figure 3:
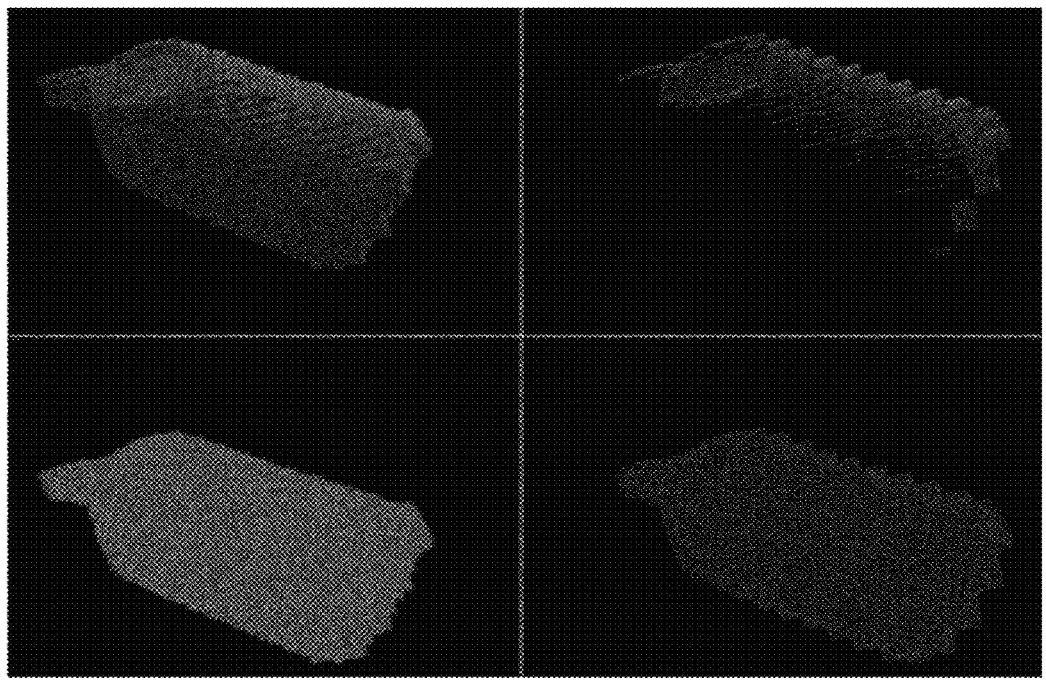
FIG. 3 is a schematic diagram showing a result of 3D image rendering of a target using the method according to an embodiment of the disclosure.

In this step, a distance map is generated for each slice. In the distance map for each slice, each element represents the shortest Euclidean distance from a current pixel to a slice boundary in the slice. Here, if a plane in which the slice is located is used to intercept volume data, the interception line between the plane and the volume data is defined as slice boundary. The distance is negative inside the target and positive outside the target. Then the distance map is interpolated in the z direction. Finally, a threshold is set to reserve only parts of gray value 0. FIG. 3 shows the result of rendered 3D image of the target with the shape-based interpolation. As shown in FIG. 3, the diagram at the upper right corner shows a rendering result of the target without the interpolation process, while the diagram at the upper left corner shows a rendering result of the target with the interpolation. It can be seen that the rendering quality of the target is apparently improved with the interpolation process according to the present disclosure.

For the target, different ranges of gray values may represent different types of dangerous articles. A fixed color may be used to render the same type of dangerous article. Further, the volume rendering of the target may use the phong illumination model in order to better express the shape of the target. The diagrams at the lower left and right corners of FIG. 3 show the rendering results without illumination, while the diagrams at the upper left and right corners show the rendering results with the phong illumination.

Figure 4:
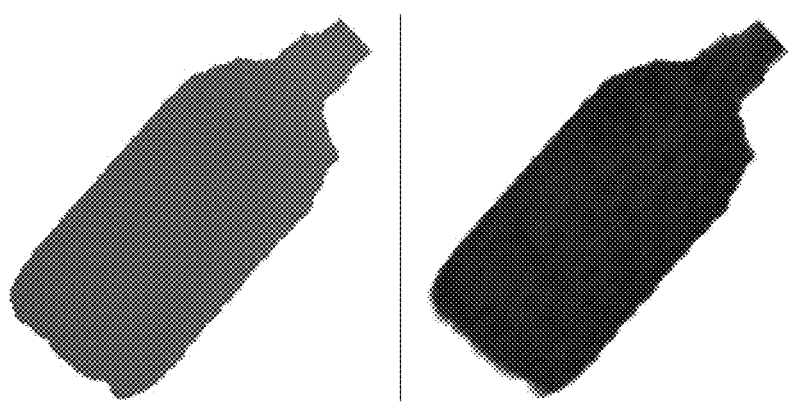
FIG. 4 is a schematic diagram showing a result of the Multiple Render Targets for the 3D image of the target.

Next, a 3D image of the target is rendered in step S300 in the method of FIG. 2. During the 3D image rendering of the target, the Multiple Render Targets (MRT) technique is used to acquire the First Hit Position (FHP) of the ray and the Direct Volume Rendering (DVR) results. MRT allows a section coloring program to save data of each pixel in a different buffer area. The FHP result records a position at which the ray first hits an opaque region of the volume data during the ray casting. Such position is recorded simultaneously with ray integration, and the hit position in the volume texture coordinate system is stored in RGB channels which output pixel colors. The left part of FIG. 4 shows the FHP result. The DVR result records the volume rendering result of the 2D image data of the target, and is shown in the right part of FIG. 4.

Figure 5:
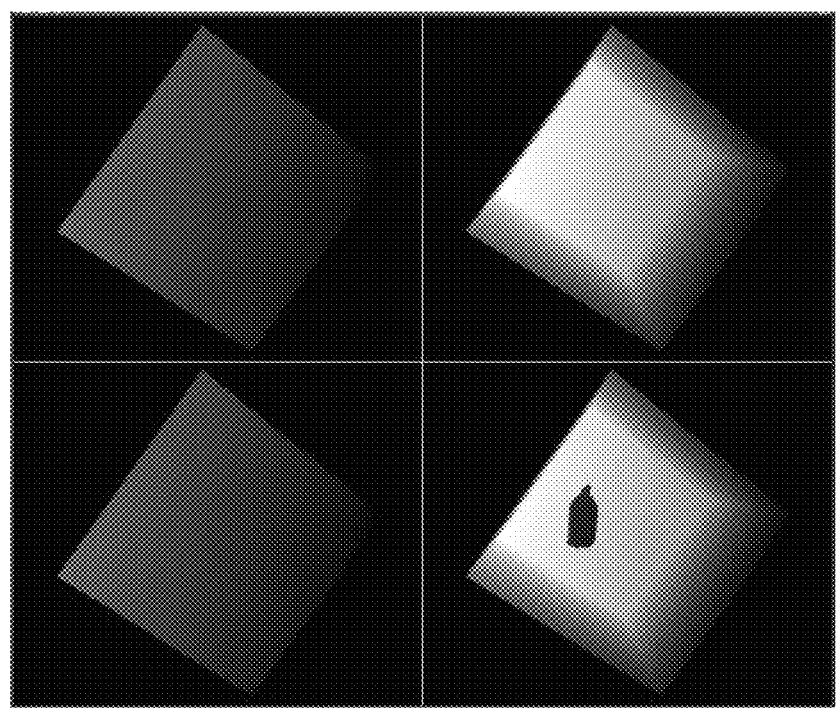
FIG. 5 is a schematic diagram showing comparison between 3D images of background before and after modification.

As shown in step S400 of the method in FIG. 2, the 3D image of the background is rendered. In this step, the 3D image rendering of the background is performed with the ray casting method. During the ray casting, the actual enclosure box of the CT original data is used as a carrier for volume texture which corresponds to the enclosure box via the text coordinates. Then, a radial is drawn from a viewpoint to a point of a model. The radial passing through the space of the enclosure box is equivalent to the radial passing through the volume texture. At the current viewangle, a front depth image is obtained by rendering data enclosure box, removing sections having large depth values, and rendering a scene depth image. On the other hand, a rear depth image may is obtained by removing sections having small depth values, and rendering the scene depth image. The left and right upper parts of FIG. 5 show respectively the results of the rendered front and rear depth images of the background.

The 3D image of the background and the 3D image of target may be synthetically rendered after they have been rendered respectively. Before the rendering, the front and rear depth image data of the background are modified according to the above FHP result at step S500 of the method in FIG. 2, thereby adjusting the ray hit and exit positions. FIG. 1b has shown the principle for adjusting the ray hit and exit positions.

As shown in FIG. 1b, the sides a1 and a2 of the quadrangle are adjusted ray hit positions, and the bold part of the sides a3 and a4 and the bold part of the middle curve a5 are adjusted ray exit positions. The start positions for casting of the rays $I_0$, and $I_2$ are unchanged, while the ray $I_1$ is truncated at the corresponding FHP of the target because the exit position of the ray $I_1$ is blocked by the target. The left and right lower parts of FIG. 5 show respectively the results of the rendered front and rear depth images of the background with the ray hit and exit positions being adjusted.

Figure 6:
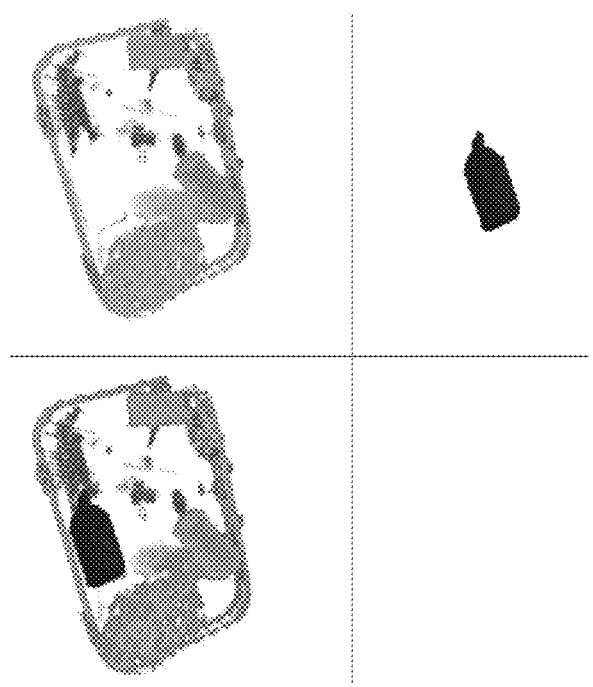
FIG. 6 is a schematic diagram showing a result of rendering of the 3D images of background and target.

Next, the 3D image of the background is re-rendered based on the obtained new front and rear depth images, and the 3D image of the target is also re-rendered, as shown in step S600 of the method in FIG. 2. In this step, several rays are emitted from an observation point, and pass through all the pixels in the imaging plane. The hit and exit positions of the current rays are obtained by retrieving the front and rear depth images, respectively. According to the opacity of voxels penetrated by any ray passing through an object, the color values at the voxels' positions are accumulated to obtain a value of a corresponding pixel in the image plane, thereby obtaining the 3D background image shown in the upper left corner of FIG. 6. The 2D image data of the target are similarly applied with ray casting to obtain the 3D target image shown in the upper right corner of FIG. 6.

At step S600, the re-rendered 3D images of the background and the target are subjected to the well-known Alpha synthesis to obtain the rendering result shown in the lower left corner.

Figure 7:
FIG. 7 is a schematic diagram showing comparison between direct rendering and the rendering of the present disclosure of the 3D images of background and target.

In the embodiment of the present disclosure, the FHP result of the rendering data of the target is used to modify the front and rear depth images of the background, and thus adjust the current ray hit and exit positions. Such rendering reserves the spatial position relation of the target in the background. FIG. 7 shows comparison between direct rendering and the rendering of the present disclosure of the 3D images of background and target. The left side of FIG. 7 shows that the 2D image data and the background and the target are first applied with ray casting, respectively, and then the results of the ray casting are synthetically rendered. This conventional method cannot reflect the spatial position and blocking of the target. The right side of FIG. 7 shows the synthesis result obtained by the method of the present disclosure which reserves the spatial position relation of the target in the background.

After the synthetic-rendered 3D image is obtained, the outline of the target may be extracted from the 3D image to highlight the target, as shown in step S700 of the method in FIG. 2.

Figure 8:
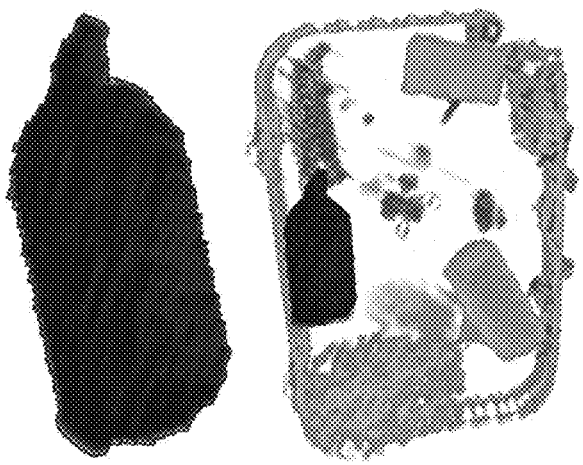
FIG. 8 is a schematic diagram showing a result of extracting an outline of the target from the synthesized 3D image.

The final rendering result of the target is a single image per viewpoint. The result is stored in Frame Buffer Object (FBO) for Texture Baking. To highlight the display of the target, detection and extraction of the target's edge may be performed on the final volume rendering result with the Sobel operator in the image space, as in step S700 of the method of FIG. 2. The detection and extraction result is shown in the left side of FIG. 8. Each time the viewpoint is rotated, the extraction of the target's edge is repeated in a newly generated FBO, thereby avoiding expensive computation cost for 3D profile extraction while achieving similar visual effects. The right side of FIG. 8 shows the final rendering effects.

In this way, the inspector may highlight the target by clicking on the target in the final volume rendering image, or any identified target may be highlighted automatically through edge detection and extraction. This enables the inspector to quickly distinguish the target from any other object while indicating the range of the target.

The method of the present disclosure may be implemented in computer software, computer hardware or combination thereof.

The embodiments here illustrate exemplarily the method for rendering of CT image data. Those skilled in the art can understand that the disclosed embodiments can be modified or changed in various ways without departing from the spirit and scope defined by the appended claims.

The foregoing detailed description has set forth various embodiments of method and apparatus for rendering of CT image data by use of block diagrams, flowcharts, and/or examples. Insofar as such block diagrams, flowcharts, and/or examples contain one or more functions and/or operations, it will be understood by those skilled in the art that each function and/or operation within such examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of those skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the esprit or essence of the disclosure. It should be understood that the embodiments are not limited to any of the foregoing details, and shall be interpreted broadly within the esprit and scope as defined by the following claims. Therefore, Modifications and alternatives falling within the scope of the claims and equivalents thereof are to be encompassed by the scope of the present disclosure which is defined by the claims as attached.

What is claimed is:

1. A method for rendering of CT image data, comprising steps of:
   acquiring 2-Dimensional (2D) image data of a background and 2D image data of a target;
   rendering the 2D image data of the target into a 3-Dimensional (3D) image of the target to obtain a first hit position of a ray;
   rendering the 2D image data of the background into a 3D image of the background;
   adjusting the 3D image of the background based on the first hit position; and
   synthetically rendering the 3D image of the background and the 3D image of the target.

2. The method according to claim 1, further comprising:
   detecting and extracting an edge of the target in the synthetically-rendered 3D image.

3. The method according to claim 1, wherein the rendering is performed using the Ray Casting method.

4. The method according to claim 1, wherein the step of adjusting the 3D image of the background based on the first hit position comprises modifying a front-depth 3D image and a rear-depth 3D image of the background.

5. The method according to claim 1, wherein the position of the initial incidence point of the ray is obtained using the Multiple Render Targets technology during rendering of the 3D image of the target.

6. The method according to claim 1, further comprising:
interpolating the 2D image data of the target based on a shape of the target, wherein the interpolated 2D image data of the target are rendered into the 3-Dimensional (3D) image of the target to obtain the first hit position of the ray.

7. An apparatus for rendering of CT image data, comprising:
means for acquiring 2-Dimensional (2D) image data of a background and 2D image data of a target;
means for rendering the 2D image data of the target into a 3-Dimensional (3D) image of the target to obtain a first hit position of a ray;
means for rendering the 2D image data of the background into a 3D image of the background;
means for adjusting the 3D image of the background based on the first hit position; and
means for synthetically rendering the 3D image of the background and the 3D image of the target.

8. The apparatus according to claim 7, wherein the means for adjusting the 3D image of the background based on the first hit position comprises means for modifying a front-depth 3D image and a rear-depth 3D image of the background.

9. The apparatus according to claim 7, wherein the means for rendering into the 3D image of the target obtains the position of the initial incidence point of the ray by using the Multiple Render Targets technology.

10. The apparatus according to claim 7, further comprising:
means for interpolating the 2D image data of the target based on a shape of the target,
wherein the means for rendering into the 3D image of the target renders the interpolated 2D image data of the target into the 3-Dimensional (3D) image of the target to obtain the first hit position of the ray.

* * * * *